United States Patent [19]

Kanao

[11] Patent Number: 4,862,924
[45] Date of Patent: Sep. 5, 1989

[54] FLEXIBLE HARD PIPE

[76] Inventor: Shiro Kanao, No. 9-18, Nanpeidai 4-chome, Takatsuki-shi, Osaka, Japan

[21] Appl. No.: 320,838

[22] Filed: Mar. 8, 1989

Related U.S. Application Data

[63] Continuation of Ser. No. 944,067, Dec. 22, 1986, abandoned.

[30] Foreign Application Priority Data

Apr. 23, 1986 [JP] Japan ................................. 61-61094
Aug. 8, 1986 [JP] Japan ................................ 61-122550

[51] Int. Cl.4 ............................................. F16L 11/11
[52] U.S. Cl. ................................... 138/144; 138/122; 138/129; 138/154; 138/173; 138/150
[58] Field of Search ............... 138/120, 121, 122, 129, 138/132, 133, 134, 135, 137, 138, 140, 141, 143, 144, 148, 154, 172, 173, 174, 150

[56] References Cited

U.S. PATENT DOCUMENTS

| 3,204,666 | 9/1965 | Lindsay et al. | 138/135 |
| 4,140,154 | 2/1979 | Kanao | 138/132 |
| 4,383,555 | 5/1983 | Finley | 138/122 |
| 4,403,631 | 9/1983 | Abdullaev et al. | 138/132 X |
| 4,487,232 | 12/1984 | Kanao | 138/122 |
| 4,531,551 | 7/1985 | Eichelberger et al. | 138/144 X |
| 4,620,569 | 11/1986 | Von Glanstatten et al. | 138/132 |

Primary Examiner—James E. Bryant, III
Attorney, Agent, or Firm—Sughrue, Mion, Zinn, Macpeak & Seas

[57] ABSTRACT

A flexible hard pipe in which over a soft inner pipe wall a hard belt-like member is helically wound. The belt-like member has a double-hook shape in which a flat inner surface is fused to the inner pipe wall. A raised hook portion overlaps a hook portion of the fused portion of a neighboring wrap.

14 Claims, 4 Drawing Sheets

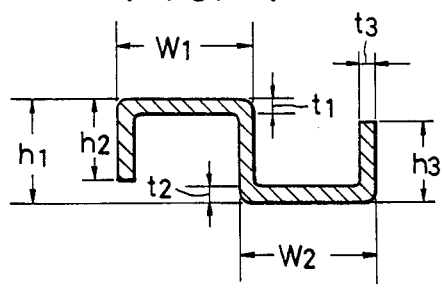
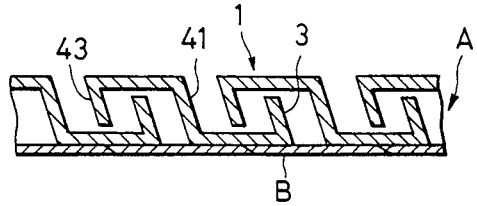
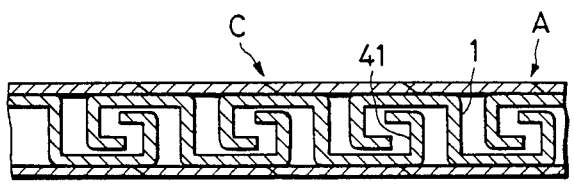
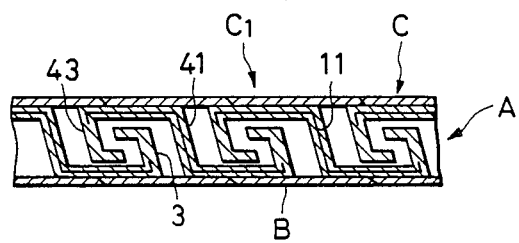
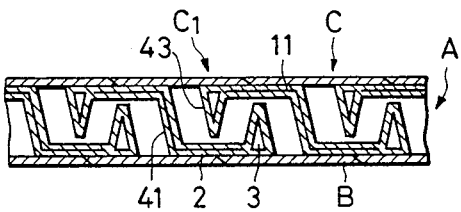
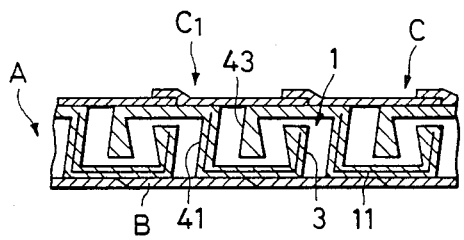

FLEXIBLE HARD PIPE

This is a continuation of application Ser. No. 944,067 filed 12/22/86, now abandoned.

BACKGROUND OF THE INVENTION

1. Field of the Invention

The present invention relates to flexible hard pipes which are pipes to be used mainly for transporting air and water, for protecting cables, or the like, and which are pressure-containing pipes adapted to be used on or above the ground, or buried under ground.

The present invention particularly relates to hard pipes which, in spite of their pressure-containing property, are flexible so as to facilitate pipe laying and the transportation of pipes even when the pipes are buried underground and receive externally exerted pressure or are used as pipes carrying high-pressure fluid.

2. Background Art

As conventional hard pipes, there are known not only drawn pipes but also metal pipes which are formed such that a belt-like member is helically wound with its side edges abutted and seam-connected with each other by welding or the like. On the other hand, there are also pipes which are galvanized or the like or which are lined with a synthetic resin material over their inner peripheral surfaces so as to maintain an anti-corrosion property. Further, there have been generally used synthetic resin pipes containing no metal, such as so-called vinyl chloride pipes, which are extruded and molded from only a hard vinyl chloride material, or the like. Further, synthetic resin pipes have been already widely used which are formed such that a belt-like member made of synthetic resin is helically wound and opposite side edges thereof are superimposed and fused with each other.

However, an enormous investment in plant and equipment is required in manufacturing the well known drawn pipes, and much trouble and cost and required in seam-welding the latter seam-connected metal pipes. Significant equipment and cost must be required in galvanizing and in lining with synthetic resin. Particularly, it has been technically difficult to uniformly apply anti-corrosion treatment on the entirety of the inner surface of elongated pipes. Further, the synthetic resin pipes in which pipe bodies are formed by successively winding a synthetic resin belt-like member have superior advantages in that the pipes are light so that transportation is facilitated when compared with the pipes made of metal. Furthermore, anti-corrosion treatment is unnecessary. However, such wound synthetic resin pipes have such disadvantages that yield strength relative to tensile strength in the axial direction of pipe is not always sufficient so that the pipes are stretched in the axial direction of pipe when a high-pressure fluid is passed through the pipes and are apt to lack compressive strength against external pressure, so that the pipes did not always have enough strength for use for transmitting high-pressure fluid or for the purpose of being embedded underground.

SUMMARY OF THE INVENTION

An object of the present invention is to provide a hard pipe in which a synthetic resin material apt to lack anti-squeezing (compressive) strength as well as anti-stretching (tensile) strength is used, alone or together with a metal material. In such a pipe, the above-mentioned problems caused in the synthetic resin pipes of the kind as described above are solved, so that the pipes are superior in compressive strength as well as tensile strength, the pipes can be widely used for transmitting high-pressure fluid or for the purpose of being embedded underground. Nonetheless, the pipes are flexible to thereby make it possible to bend the pipes in arranging the pipes.

BRIEF DESCRIPTION OF THE DRAWINGS

FIGS. 1 through 4 are views showing an embodiment of the pipe according to the present invention, in which
FIG. 1 is a partly cut-away front view of the pipe,
FIG. 2 is a cross-section showing the arrangement of pipe walls,
FIG. 3 is an exploded cross-section of the pipe wall arrangement, and
FIG. 4 is an enlarged cross-section of the hard belt-like member;
FIG. 5 is an enlarged cross-section showing the pipe wall arrangement of another embodiment;
FIGS. 6 through 8 are view showing a further embodiment, in which FIG. 6 is a partly cut-away front view of the pipe,
FIG. 7 is an enlarged cross-section of the pipe wall arrangement, and
FIG. 8 is an exploded cross-section of the same; and
FIGS. 9 through 15 are enlarged cross-sections of pipe wall arrangements in other embodiments respectively.

DETAILED DESCRIPTION OF THE PREFERRED EMBODIMENTS

Figure 1:
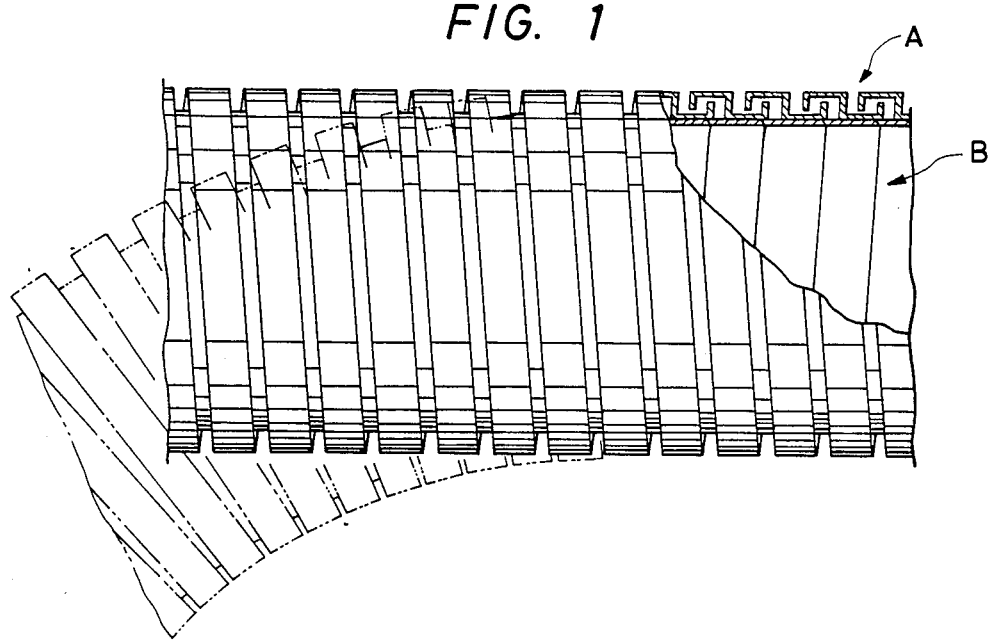
Figure 2:
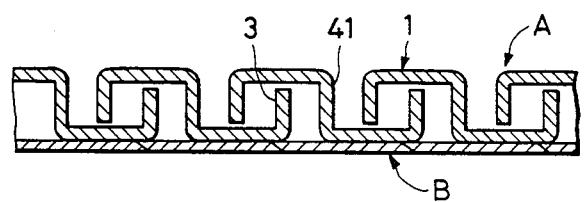
Figure 3:
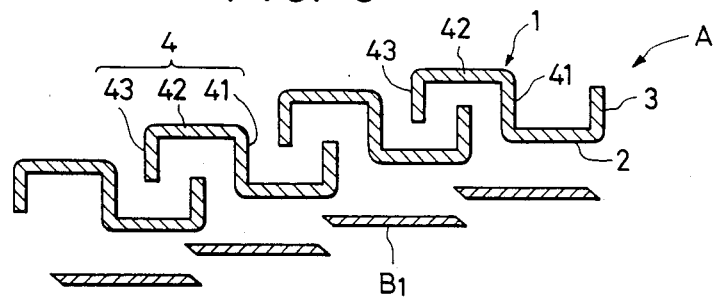

The present invention relates to a flexible hard pipe which can extremely easily and surely achieve the above-mentioned object. Referring to FIGS. 1 through 4 illustrating an embodiment of the present invention, the hard pipe according to the present invention is provided with two main inner and outer parts, that is, an inner pipe wall B made of a soft synthetic resin material and an outer pipe wall A constituted by a helically round belt or belt-like member 1 made of a hard material. The outer pipe wall A is helically wound on an outer periphery of the inner pipe wall B and is integrally fused with the inner pipe wall B. The hard belt-like material 1, as shown in FIG. 3, has such a cross-sectional shape that is composed of a substantially linear base portion 2, an upward or radially outward extending portion 3 continuing from one side edge of the base portion 2, and a downwardly or radially inward opening, substantially U-shaped portion 4. The downward opened substantially U-shaped portion 4 is composed of another upward or radially outward extending portion 41 continued from the other side edge portion of the base portion 2, a linear ceiling portion 42, and a downward or radially inward extending portion 43. The belt-like member 1 is in contact and fused with the outer periphery of the inner pipe wall B only at a lower surface of the base portion 2 of the hard belt-like material 1. The the illustrated embodiment of FIGS. 1-4 (as well as the other embodiments) the helical wound belt 1 is configured to produce linked helical turns with each helical turn in transverse cross section having oppositely radially directed openings. Further, the helical turns are edge overlapped such that the first radially outward extending portion 3 and the radially inward extending portion 43 of a given helical turn are respectively positioned within the opening of the helical turns immediately adjacent thereto to link the wrapped helical turns of the hard, outer pipe wall A.

The hard pipe having such a structure as described above can be arranged in a building or in a factory, or embedded underground, or can be used fluid flow through the pipe, or for enclosing wires or the like passing through the pipe.

Referring to the drawings, specific embodiments of the present invention will be described hereunder.

First, materials to be used will be described. Synthetic rubber, a mixture of synthetic resin and synthetic rubber, synthetic resin materials or the like in a group of vinyl chloride, a group of polyolefin such as polyethylene, polypropylene, etc., are selectively used as a synthetic resin material for forming both the soft inner and the hand outer pipe walls A and B in accordance with the purpose of use. Further, the hardness of each of the hard and soft materials is suitably selected by adjusting the plasticizer or the like.

For example, with respect to the pipes arranged in a factory for use for transporting chemicals or the like, consideration is made such that a chemical-proof resin to be used as the synthetic resin material for forming an inner pipe wall B is selected in accordance with the kind of chemicals to be conveyed. A weatherproof resin which is resistant against deterioration owing to changes of external weather, temperature, or the like, is used as the synthetic resin material for the outer pipe wall A (or as a coating pipe wall C in embodiments as illustrates in FIGS. 6 through 15 which will be described later). As illustrated in the embodiment shown in FIGS. 6 through 8, a resin-coated metal belt-like member 1, which is made by coating a metal band 11 with a synthetic resin 12, may be used as the hard belt-like member for forming the outer pipe wall A. Steel plates, stainless steel plates, iron plates, and other metal plates are desirably selectively used as a material for such a metal band member 11 in accordance with the use of the pipes to be formed. Then plates having a thickness within a range of about 0.3 to 3 mm are suitably selected taking into consideration the diameter of the pipes to be formed, the externally and internally applied pressure to be withstood by the pipes, the purpose and place of use of the pipes, and so on. Further, the metal band member 11 may be not only a flat belt-like one but a punched metal one in which a number of small holes are bored. Further, a bandage-like belt member made by knitting metal wires in the form of a net may be used as the metal band member 11.

FIGS. 1 through 4 are views showing an embodiment according to the present invention. Although the outline of the arrangement shown in FIGS. 1 through 4 has been described in the above introductory paragraph, the arrangement will be further described hereunder. As shown in FIG. 3, an inner pipe wall B is formed such that a soft synthetic resin belt-like member $B_1$ forming the inner pipe wall B is extruded in the form of a belt from a not-shown extruder under the condition of a temperature not lower than a softening pont but not higher than a melting point of the synthetic resin. The belt-like member $B_1$ is helically wound on a mandrel so as to be superimposed at its opposite side edge portions on succeeding wraps. The superimposed portions are pressed from their upper surfaces, as required, by a pressing roller so as to be fused and to be stuck to each other.

Then, an outer pipe wall A is formed from a hard synthetic resin belt-like member 1 composed in cross-section of a substantially linear base portion 2, an upward extending portion 3 continuing from the base portion 2 at its right side of the drawing, and a downwardly opened, substantially U-shaped portion 4 including another upward extending portion 41 continued from the base portion 2 at is left side in the drawing, a ceiling portion 42 horizontally extending left from the upward extending portion 41, and a downward extending portion 43 extending downwardly from the left end of the ceiling portion 42. The belt-like member 1 is separately formed and then successively wound in a helix onto an outer peripheral surface of the prepared inner pipe wall B. Only the lower surface of the base portion 2 is caused to abut on and to be fused with the outer peripheral surface of the inner pipe wall B. Furthermore, the belt-like member 1 is wound at a pitch such that an upper portion of the upwardly extending portion 3 of the preceding wrap of the belt-like member 1 is covered by the downwardly opened U-shaped portion 4 of the succeeding wrap of the belt-like member 1.

As shown in FIG. 4, the structure of the hard belt-like member 1 forming the outer pipe wall A as illustrated in the embodiment is featured in that its cross-section has the following properties. (1) The width $W_1$ between the upwardly extending portion 41 and the downwardly extending portion 43 and the width $W_2$ between the upwardly extending portion 3 and the upward extending portion 41 of the hard belt-like member 1 are set to have a relationship in that $W_1$ approximately equals $W_2$. (2) The height $h_1$ between the lower surface of the base portion 2 and the upper surface of the ceiling portion 42, the length $h_2$ of the downwardly extending portion 43, and the height $h_3$ of the upwardly extending portion 3 of the belt-like member 1, are set to have relationships that $h_1$ is greater than $h_2$ and $h_2$ is approximately equal to $h_3$. (3) The height $h_1$, the length $h_2$ and the thickness $t_2$ of the base portion 2, of the hard belt-like member 1, are set to have a relationship that $h_1$ is equal to or greater than the sum of $h_2$ and $t_2$. (4) The height $h_1$, the height $h_3$ and the thickness $t_1$ of the ceiling portion 42, of the hard belt-like member 1, are set to have a similar relationship that $h_1$ is equal to or greater than the sum of $h_3$ and $t_1$.

Figure 15:
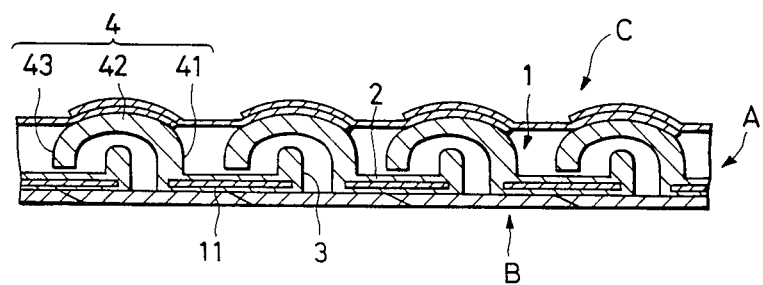

It is not necessary that the downwardly opened U-shaped portion 4 of the hard belt-like member is U-shaped, but may be such a downwardly opened semicircular form, as shown in FIG. 15, or other various kinds of forms as required. As is easily understood from FIG. 15, in the relationship between the width $W_1$ between the upward extending portion 41 and the downward extending portion 43 and the width $W_2$ between the upward extending portion 3 and the upward extending portion 41 of the hard belt-like member 1, it is not always necessary that $W_1$ be approximately equal to $W_2$. Instead $W_1$ may be less than or greater than $W_2$.

FIG. 5 is a view showing another embodiment which is arranged such that the upward extending portion 3, the upward extending portion 41, and the downward extending portion 43 of the hard belt-like member 1 shown in the above-mentioned embodiment are slanted in one direction (to the left in the drawing in this embodiment).

Next, referring to FIGS. 6 through 15, description will be made as to various embodiments each having such an arrangement that a coating pipe wall C is formed on the outer peripheral surface of an outer pipe wall A to cover the outer pipe wall A. According to the present invention, however, it is not fundamentally necessary to provide the coating pipe wall C as shown in the above-mentioned embodiments. Therefore, it will be appreciated that the description of various embodiments which will be made herunder apply as well to corresponding embodiments having no coating pipe wall C.

Figure 6:
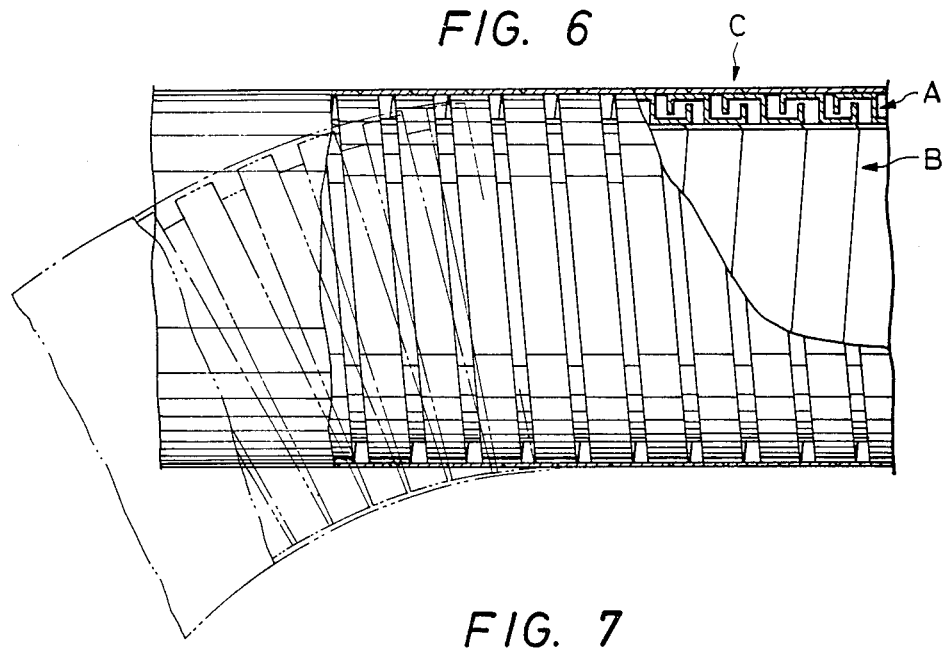
Figure 7:
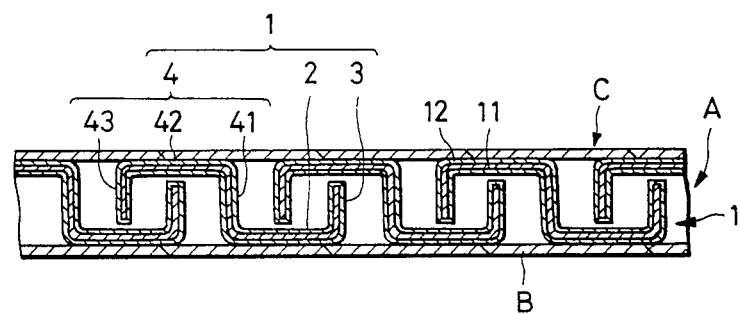
Figure 8:
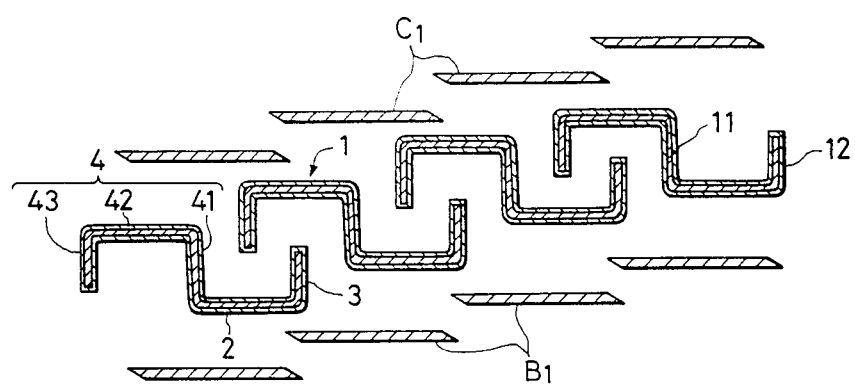

In the embodiment shown in FIGS. 6 through 8, the hard belt-like member 1 forming the outer pipe wall A is formed substantially in the same shape as that of the hard belt-like member 1 shown in the embodiment illustrated in FIGS. 1 through 4. As mentioned previously, the hard belt-like member 1 is formed by coating a metal band member 11 with synthetic resin 12. In the same manner as in the embodiment illustrated in FIGS. 1 through 4, the outer pipe wall A is formed such that the hard-belt like member 1 is successively wound as a helix on the outer peripheral surface of the inner pipe wall B formed by helically winding a soft synthetic belt-like member $B_1$. The winding of the outer pipe wall A is such that the base portion 2 is brought into contact and fused with the outer peripheral surface of the inner pipe wall B only at the lower surface of the base portion 2. A flat soft synthetic resin belt-like member $C_1$ for forming a coating pipe wall C is separately extruded from a not-shown extruder and is helically wound on the outer periphery of the outer pipe wall A such that the opposite edge portions of the belt-like member $C_1$ are superimposed one on the other. Depending upon requirements, the superimposed portions may be pressed by a pressing roller to be fused with each other as well as to the outer peripheral surface of the ceiling portion 42 of the hard belt-like member 1.

FIG. 9 shows another embodiment in which a hard belt-like member 1 is made only of a hard synthetic resin material and is arranged such that an upper end of an upwardly extending portion 3 and a lower end of a downward extending portion 43 are respectively bent toward each other and to respective upward extending portions 41.

FIG. 11 shows a further embodiment having such an arrangement that the upwardly extending portion 3, the upward extending portion 41, and the downwardly extending portion 3, the upwardly extending portion 41, are all slanted in one direction (to the left in the drawing). FIGS. 11 through 12 show other embodiments in which the upwardly extending portion 3 and the downwardly extending portion portion 43 are shaped to be hollow triangles (FIG. 11), or in which each of an upwardly extending portion 3 and a downwardly extending portion 43 is shaped as an inverted triangle or an inverted trapezoid (FIG. 12). In the embodiment of FIG. 12, the upwardly extending portion 41 is slanted right in the drawing.

Figure 13:
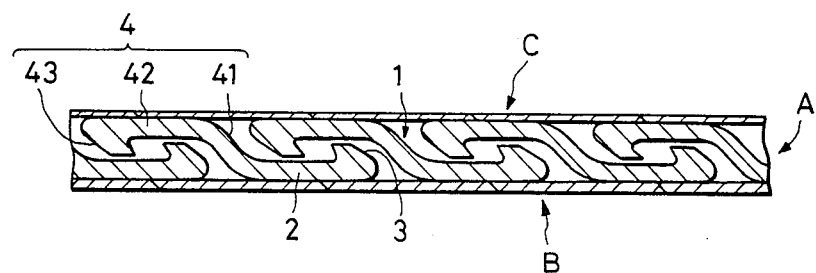
Figure 14:
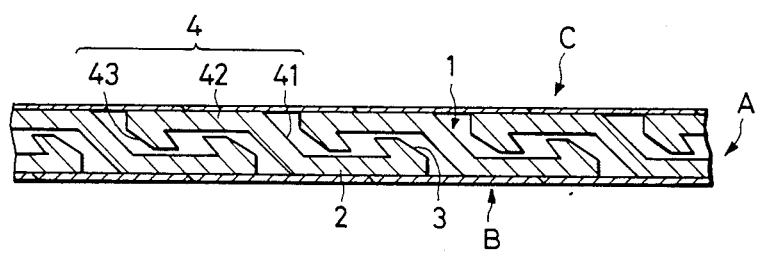

FIGS. 13 and 14 show further embodiments in each of which an upwardly extending portion 41 is slanted to left, and an upwardly extending portion 3 and a downwardly extending portion 43 are also slanted in the same direction as the upward extending of the upward extending portion 41, similarly to the embodiments shown in FIGS. 5 and 10. Also, in these embodiments, the respective ends of the upward extending portions 3 and the downward extending portions 43 rounded (FIG. 13) or square (FIG. 14) respectively. In the embodiment of FIG. 13 the thickness of a coating pipe wall C is made thinner than that of an inner pipe wall B, and in the embodiment of FIG. 14 both the inner pipe wall B and the coating pipe wall C is made to be in a form of a thin film.

The hard belt-like member 1 shown in each of the embodiments of FIGS. 10 through 12 and 15, is partially internally provided with a metal band 11. In the embodiment of FIG. 10, the metal band member 11 is internally provided to extend from a base portion of the upwardly extending portion 3 to a base portion of the downwardly extending portion 43. In the embodiment of FIG. 11, the metal band 11 extends in a Z-shaped portion along the base portion 2, the upwardly extending portion 41, and the ceiling portion 42. In the embodiment of FIG. 12, the metal band 11 extends in a U-shaped portion along the upwardly extending portion 3, the base portion 2, and the upwardly extending portion 41. In the embodiment of FIG. 15, the metal belt 11 extends only in the base portion 2. Thus, it is not always necessary to use the metal band 11 over the whole region of the hard belt-like member 1 in such a manner as illustrated in the embodiment shown in FIGS. 6 through 8, but may be desirably provided in accordance with the purpose of use of the hard pipe to be produced.

Neither the inner pipe wall B nor the coating pipe wall C according to the present invention necessarily needs to be made by helically winding a belt-like member as illustrated in each of the above-mentioned embodiments, but may be instead cylindrically extruded. Although for the helically wound hard belt-like member 1, the relative positional relationship between the fused portion and the position where the hard belt-like member 1 is helically wound is not particularly limited, it is advantageous to have such an arrangement that the base portion 2 of the hard belt-like member 1 is superimposed on the fusing portion of the inner pipe wall B (the belt-like member $B_1$) and that the coating pipe wall C (the belt-like member $C_1$) is superimposed on the ceiling portion 42. The advantage is that the fusing can be more firmly performed.

The present invention can be built with the following materials. (1) the hard belt-like member 1 and/or the inner pipe wall B and the coating pipe wall C may be made of a synthetic resin material in a group of polyolefin such as polyethylene, polypropylene, or the like, or of another synthetic resin material in a group of vinyl chloride. (2) The hard belt-like material 1 may be made of fiber resin-forced composite resin (FRP) which is made by reinforcing synthetic resin with very strong fibers such as whisker, glass, boron, carbon, alumina ($Al_2O_3$), silicon carbide (SiC) or the like hard rubber, or fiber reinforced rubber (FRR) which is made by reinforcing rubber with such very strong fibers, as described above. (3) The hard belt-like member 1 may be formed with a metal band plate. (4) The hard belt-like member 1 may be formed with a metal band plate lined on its inner and outer surfaces with a synthetic resin material or a rubber material. (5) The metal band plate may be formed of a punched metal in which a number so small holes are bored.

The typical embodiments according to the present invention have been described above. However, the present invention is not limited to only those embodiments, but can be suitably modified and carried out within a range in which the constituent features of the present invention are provided, the objects of the present invention can be achieved, and the effects which will be described later can be obtained.

According to the present invention, as described above with respect to the embodiments and as stated in the introductory paragraph, a specially shaped hard belt-like member 1 made of a hard material, perhaps including a metal band member 11, is partially integrally fused with an outer peripheral surface of an inner pipe wall B made of the soft synthetic resin material. Accordingly, the thus produced pipe is limited to not axially extend beyond a predetermined extent so that the tensile strength in the axial direction of the pipe is remarkably increased when compared with the conventional synthetic resin helical pipe. Further, the inner pressure withstanding strength of the pipe can be significantly increased, and necessary strength against externally exerted compressive force can be held sufficiently by the hard outer pipe wall. Thus, it is possible to obtain strong pressure-withstanding pipes which can be stably used as pipes for high-pressure fluid or pipes to be buried underground, in spite of its lightness. Further, in spite of having pressure-withstanding property, the pipes have a further extremely unique effect, which the conventional hard pipes have never been expected. Namely, the pipes can be laid along a curved path owing to the capability of expansion and contradiction of the hard outer pipe wall and the flexibility of the inner pipe wall during the pipe laying (as shown by two-dotted chain lines in FIGS. 1 and 6).

In the case where the outer peripheral surface of the hard belt-like member 1 is coated with a pipe wall C made of a soft synthetic resin material, as illustrated in the embodiments shown in FIGS. 6 through 15, the hard pipe according to the present invention has such advantages that even if concave portions are formed in the hard belt-like member when the pipe is stretched or bent, the outer peripheral portion is coated with the coating pipe wall, so that there is no fear that external materials such as stones, soil, or the like, can come into the concave portions. Such materials would prevent the pipe from changing its shape into a contacted state. Thus the coating pipe wall makes it possible to use the pipe conveniently and more stably as a pipe arranged on or above the ground or as a pipe to be embedded under the ground.

I claim:

1. A flexible hard pipe, comprising an inner pipe wall made of a soft synthetic resin material and an outer pipe wall comprising a helically wrapped belt of interlinked turns of a hard material formed substantially of synthetic resin helically wound on the outer periphery of said inner pipe wall and integrally fused with said inner pipe wall, said helically wrapped hard belt having in cross section a substantially linear base portion, a first radially outwardly extending portion continued from a first edge of said base portion, and a radially inwardly opened substantially U-shaped portion, said inwardly opened substantially U-shaped portion including a second radially outwardly extending portion continued from a second edge portion of said base portion, a ceiling portion connected at a first end to a radially outward part of said second radially outwardly extending portion and extending parallel to said base portion, and a radially inwardly extending portion connected to a second end of said ceiling portion, said belt having a radially inner surface of said base portion solely in contact with and fused to the outer periphery of said inner pipe over the full inner surface of said base portion.

2. A flexible hard pipe having flexibility according to claim 1, further comprising a coating pipe wall made of a soft synthetic resin material formed on the outer peripheral surface of said outer pipe wall and wherein the radial inner peripheral surface of the coating pipe wall is in contact with and solely fused to the radially outer peripheral surface of said ceiling portion of said belt.

3. A flexible hard pipe having flexibility according to claim 1, in which a width ($W_1$) between said second radially outwardly extending portion and said radially inwardly extending portion is approximately equal to the width ($W_2$) between said first radially outwardly extending portion and said said second radially outwardly extending portion.

4. A flexible hard pipe having flexibility according to claim 1, in which the width ($W_1$) between said second radially outwardly extending portion and said radially inwardly extending portion is less than the width ($W_2$) between said first radially outwardly extending portion and said second radially outwardly extending portion.

5. A flexible hard pipe according to claim 1, in which the height ($h_1$) between the radially inner surface of the base portion and the radially outer surface of said ceiling portion, the length ($h_2$) of said radially inwardly extending portion and the height ($h_3$) of said first radially outwardly extending portion are such that $h_1$ is greater than $h_2$ and $h_2$ is approximately equal to $h_3$.

6. A flexible hard pipe according to claim 1, in which the height ($h_1$) between the radially inner surface of said base portion and the radially outer surface of said ceiling portion, the length ($h_2$) of said radially inwardly extending portion and the thickness ($t_2$) of said base portion are such that $h_1$ is equal to or greater than the sum of $h_2$ and $t_2$.

7. A flexible hard pipe according to claim 1, in which the height ($h_1$) between the radially inner surface of said base portion and the radially outer surface of said ceiling portion, the height ($h_3$) of said first radially outwardly extending portion, and the thickness ($t_1$) of said ceiling portion are such that $h_1$ is equal to or greater than the sum of $h_3$ and $t_1$.

8. A flexible hard pipe according to claim 1, in which said hard belt comprises one synthetic resin material of the group consisting of polyolefins and vinyl chlorides.

9. A hard pipe according to claim 1, in which said hard belt comprises a metal band coated with synthetic resin material.

10. A hard pipe according to claim 9, in which said metal band has a plurality of small holes passing therethrough.

11. A flexible hard pipe according to claim 1, wherein said first and second radially outwardlY extending portion and said radially inwardly extending portion extend in parallel to each other at an angle inclined to a radius of said outer pipe wall.

12. A flexible hard pipe according to claim 1, wherein each of said radially inwardly extending portion and said first radially outwardly extending portion has at a free end, a portion extending longitudinally towards each other.

13. A flexible hard pipe according to claim 1, wherein each of said first radially outwardly extending portion and said radially inwardly extending portion has a portion of triangular cross-section tapering towards the free end thereof.

14. A flexible hard pipe according to claim 1, wherein each of said first radially outwardly extending portion and said radially inwardly extending portion has a portion of trapezoidal cross-section with a larger width at a free end thereof.

* * * * *